United States Patent
Yoon et al.

(10) Patent No.: US 8,167,628 B2
(45) Date of Patent: May 1, 2012

(54) POLYMER SUBSTRATE FOR FLEXIBLE DISPLAY HAVING ENHANCED FLEXIBILITY

(75) Inventors: Choon Sup Yoon, Daejon (KR); Young Chul Sung, Daejon (KR); Dong Ho Cho, Seoul (KR); Duk Young Jeon, Daejon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 0 days.

(21) Appl. No.: 12/441,020

(22) PCT Filed: Sep. 11, 2008

(86) PCT No.: PCT/KR2008/005378
§ 371 (c)(1), (2), (4) Date: Mar. 12, 2009

(87) PCT Pub. No.: WO2009/038310
PCT Pub. Date: Mar. 26, 2009

(65) Prior Publication Data
US 2010/0178452 A1    Jul. 15, 2010

(30) Foreign Application Priority Data
Sep. 21, 2007 (KR) .................. 10-2007-0096262

(51) Int. Cl.
*H05K 1/00* (2006.01)
(52) U.S. Cl. .......... 439/77; 428/209; 174/254; 174/257; 174/258; 174/130
(58) Field of Classification Search .................. 428/209; 174/135, 130, 133 R, 254, 257, 258; 439/77
See application file for complete search history.

(56) References Cited

U.S. PATENT DOCUMENTS

| | | | | |
|---|---|---|---|---|
| 4,246,613 A | * | 1/1981 | Choder et al. | 348/819 |
| 4,468,702 A | * | 8/1984 | Jandrell | 348/819 |
| 4,628,365 A | * | 12/1986 | Carlton | 348/819 |
| 4,760,456 A | * | 7/1988 | Liang | 348/820 |
| 4,958,148 A | * | 9/1990 | Olson | 345/174 |
| 5,410,372 A | * | 4/1995 | Lee | 348/818 |
| 5,927,345 A | * | 7/1999 | Samson | 138/127 |
| 6,090,473 A | * | 7/2000 | Yoshikawa et al. | 428/209 |
| 6,262,364 B1 | * | 7/2001 | Yoshikawa et al. | 174/389 |
| 6,469,440 B1 | * | 10/2002 | Saito et al. | 313/582 |
| 6,492,587 B1 | * | 12/2002 | Yoshinaga | 174/350 |

(Continued)

FOREIGN PATENT DOCUMENTS
JP          07-100033          4/1995

(Continued)

OTHER PUBLICATIONS
Ban Sung Won; Patent Cooperation Treaty PCT International Search Report; International Application No. PCT/KR2008/005378; Dec. 31, 2008.

(Continued)

*Primary Examiner* — Cathy Lam
(74) *Attorney, Agent, or Firm* — William Greener; Bond, Schoeneck & King, PLLC (57) ABSTRACT

Disclosed herein is a polymer substrate for a flexible display, comprising a reticular superelastic alloy structure and/or an annular superelastic alloy structure therein. The polymer substrate has an improved flexibility because the superelastic alloy structure is embedded therein.

9 Claims, 8 Drawing Sheets

U.S. PATENT DOCUMENTS

| | | | |
|---|---|---|---|
| 7,431,981 B2 * | 10/2008 | Schneider | 428/298.1 |
| 7,691,461 B1 * | 4/2010 | Prabhu | 428/36.9 |
| 7,808,550 B2 * | 10/2010 | Misawa | 348/373 |

FOREIGN PATENT DOCUMENTS

| | | |
|---|---|---|
| JP | 09-024061 | 1/1997 |
| KR | 1020070029714 A | 3/2007 |
| WO | 2004/049050 A1 | 6/2004 |
| WO | 2009/038310 A1 | 3/2009 |

OTHER PUBLICATIONS

Ban Sung Won; Patent Cooperation Treaty PCT Written Opinion of the International Searching Authority; International Application No. PCT/KR2008/005378; Dec. 31, 2008.

* cited by examiner

POLYMER SUBSTRATE FOR FLEXIBLE DISPLAY HAVING ENHANCED FLEXIBILITY

TECHNICAL FIELD

The present invention relates to a technology of improving the flexibility of a polymer substrate for flexible displays by embedding a reticular superelastic alloy structure and/or an annular superelastic alloy structure into the polymer substrate.

BACKGROUND ART

Recently, light, thin, short, small and flexible displays have been actively researched.

A glass substrate used for conventional displays has a thickness of about 0.4~0.5 no matter how thin one tries to fabricate it, but on the other hand, a polymer substrate for flexible displays has a thickness of about 0.1~0.2 Further, the weight of the polymer substrate is ⅕ or less than that of the glass substrate, so that the polymer substrate has a much lighter weight than the glass substrate.

Moreover, the polymer substrate has a much higher durability than that of the glass substrate. Meanwhile, from the point of view of manufacturing process, displays employing a glass substrate are sequentially manufactured one by one through a batch process, but on the other hand, flexible displays employing a polymer substrate can be manufactured in large quantities through a roll-to-roll process.

The structure of such a flexible display is roughly described as follows.

Figure 1:
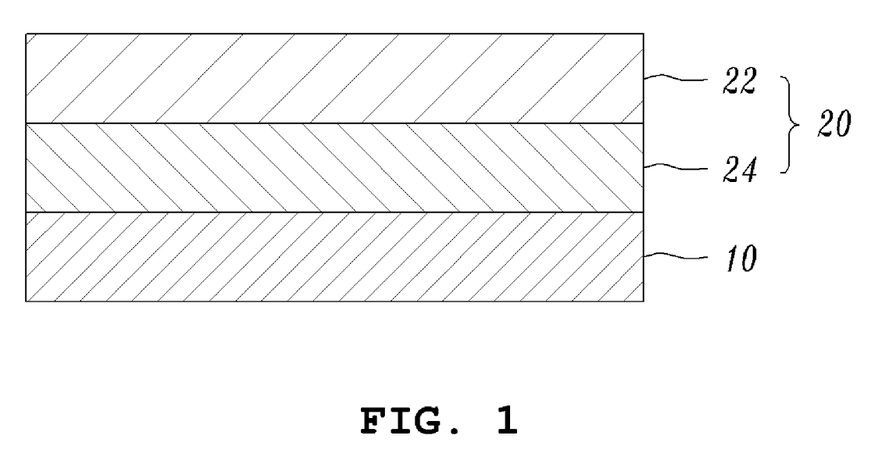
FIG. 1 is a schematic cross-sectional view showing a conventional flexible display.

Referring to FIG. 1, a flexible display includes a polymer substrate 10 and a device part 20 formed on the polymer substrate 10. The device part 20 may be embodied as display unit devices, and, from the point of view of function, includes an image display layer 22 for display an image and a driving pixel unit layer 24 for driving the image display layer 22.

When external warping stress, which is a force necessary for deforming a display in a predetermined curvature, is applied to this flexible display, the polymer substrate and the device part are elastically deformed. If the external warping stress is applied thereto within the elastic limit of the polymer substrate, the polymer substrate returns to its original state the moment the applied external warping stress is removed. However, if the external warping stress exceeds the elastic limit of the polymer substrate, the polymer substrate does not return to its original state, and is rendered plastically deformed.

As is well known to those skilled in the art, the elastic limit of the polymer substrate influences the aforementioned flexibility. In particular, a flexible display, for example, an electronic paper which is rolled as a roll of paper, must have a high flexibility.

DISCLOSURE OF THE INVENTION

Accordingly, the present invention has been made keeping in mind the above problems occurring in the prior art, and the present invention provides a method of improving the flexibility of a polymer substrate for flexible displays, and a structure of the polymer substrate manufactured using the method.

In one aspect of the present invention, a reticular superelastic alloy structure or an annular superelastic alloy structure is embedded into a polymer substrate, or these two structures are simultaneously embedded and layered thereinto.

The polymer substrate of the present invention may be made of any one selected from the group consisting of polyethylene naphthalate (PEN), polycarbonate (PC), and polyethylene terephthalate (PET).

Further, the superelastic alloy structure may be made of any one selected from the group consisting of Ni—Ti, Ni—Al, Cu—Zn—Ni, Cu—Al—Ni, Cu—Al—Mn, Ti—Ni—Cu—Mo, Co—Ni—Ga—Fe, Ag—Ni, Au—Cd, Fe—Pt, Fe—Ni, and In—Cd.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE ELEMENTS IN THE DRAWINGS

100: Flexible display
110: Device part
112: Image display layer
114: Driving pixel unit layer
120: Polymer substrate
122: Reticular superelastic alloy structure
124: Annular superelastic alloy structure

BEST MODE FOR CARRYING OUT THE INVENTION

The above and other objects, features and other advantages of the present invention will be more clearly understood from the following detailed description taken in conjunction with the accompanying drawings. In case it is judged that detailed description of the known functions and configuration thereof may obscure the gist of the invention, it should be understood that the detailed description is omitted.

Figure 2:
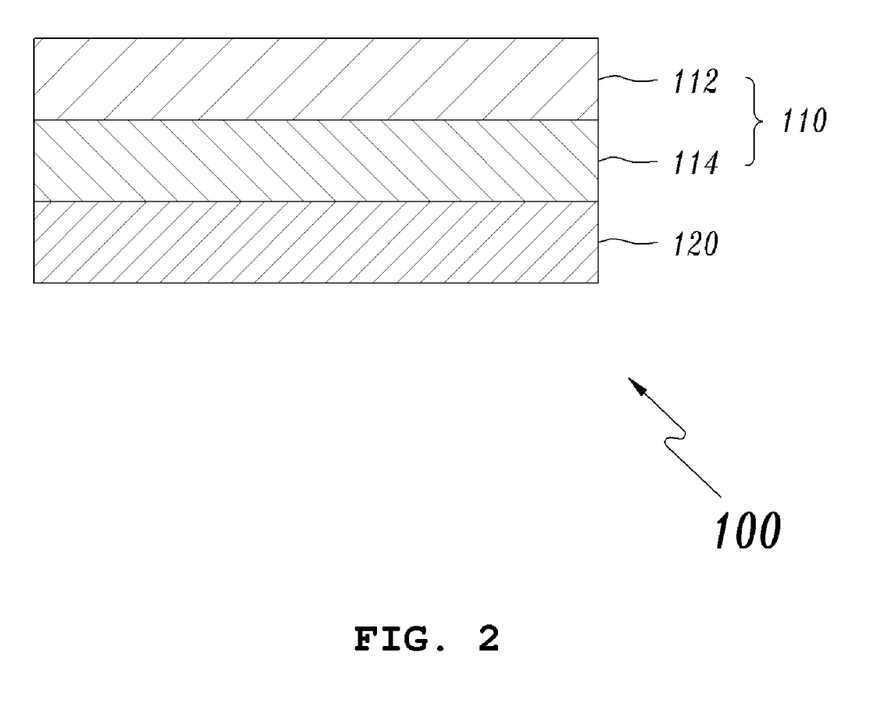
FIG. 2 is a schematic cross-sectional view showing a flexible display according an embodiment of the present invention.

FIG. 2 is a schematic cross-sectional view showing a flexible display according an embodiment of the present invention.

As shown in FIG. 2, a flexible display 100 includes a device part 110 including a plurality of display unit devices, and a polymer substrate 120 supporting the device part 110.

Specifically, the device part 110 includes an image display layer 112, and a driving pixel unit layer 114 which includes thin film transistors (TFTs) and drives the image display layer 112. The thin film transistor may be made of any one selected from among organics, polymers, amorphous silicon, polycrystalline silicon, and oxides.

This device part 110 may include various display unit devices, such as organic light emitting diodes (OLEDs), liquid crystal displays (LCDs), electronic papers (E-papers), polysilicon thin film transistors (poly-si TFTs), organic thin film transistors (organic TFTs), and the like.

The polymer substrate 120 may be made of any one selected from the group consisting of polyethylene naphthalate (PEN), polycarbonate (PC), and polyethylene terephthalate (PET).

Figure 3:
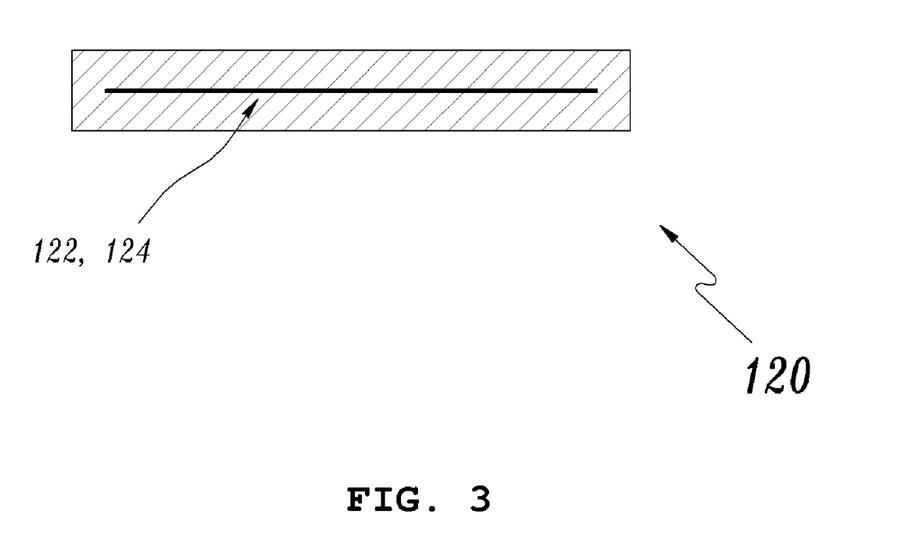
FIG. 3 is a cross-sectional view showing a polymer substrate according an embodiment of the present invention.

Meanwhile, as shown in FIG. 3, the polymer substrate 120 according to the present invention includes a reticular superelastic alloy structure 122 or an annular superelastic alloy structure 124 therein. In this case, the reticular superelastic alloy structure 122 and the annular superelastic alloy structure 124 may also be layered therein.

Figure 4A:
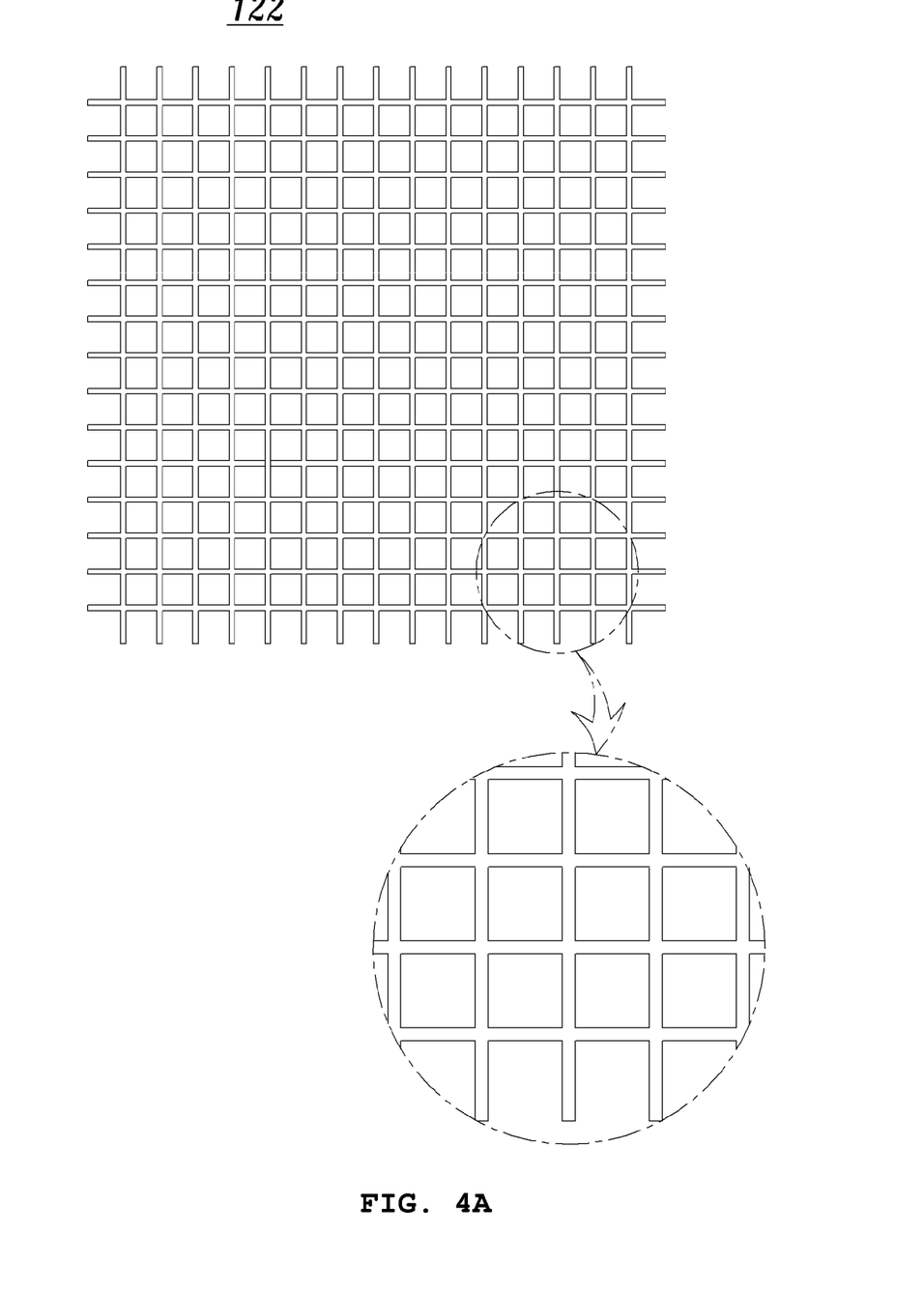
FIGS. 4A to 4C are plan views showing respective reticular superelastic alloy structures according to an embodiment of the present invention.
Figure 4B:
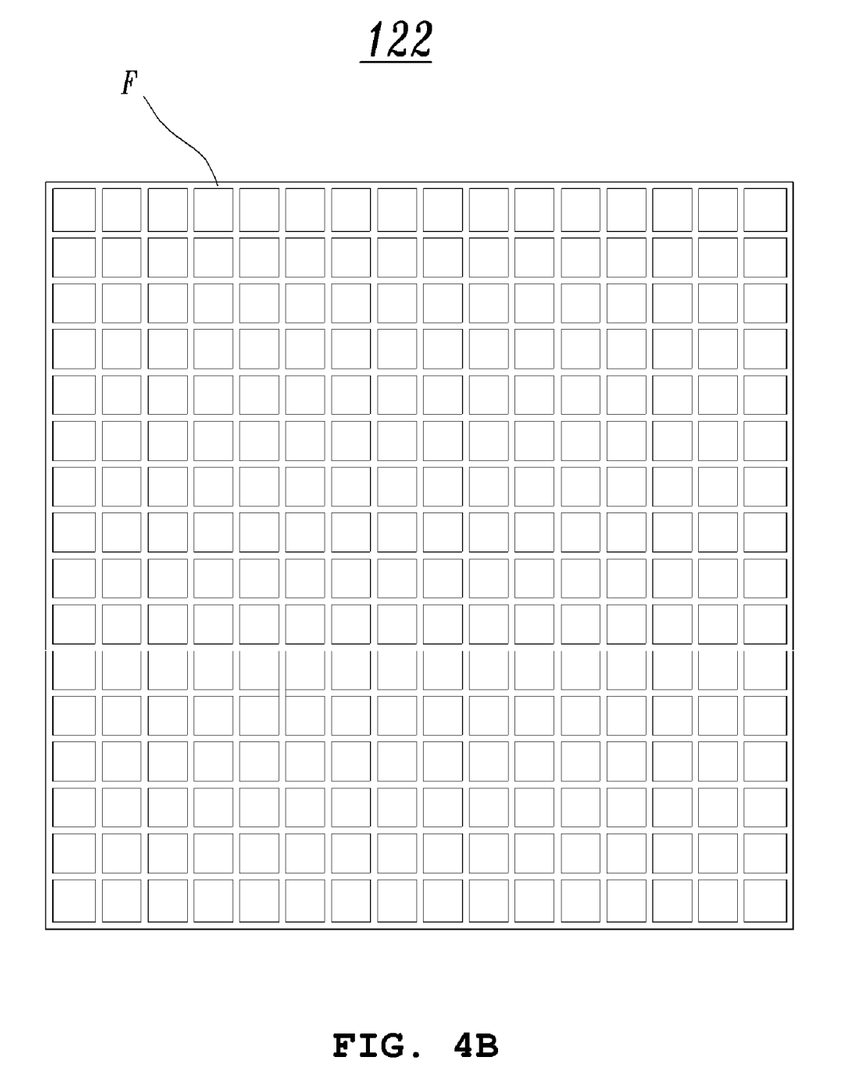
Figure 4C:
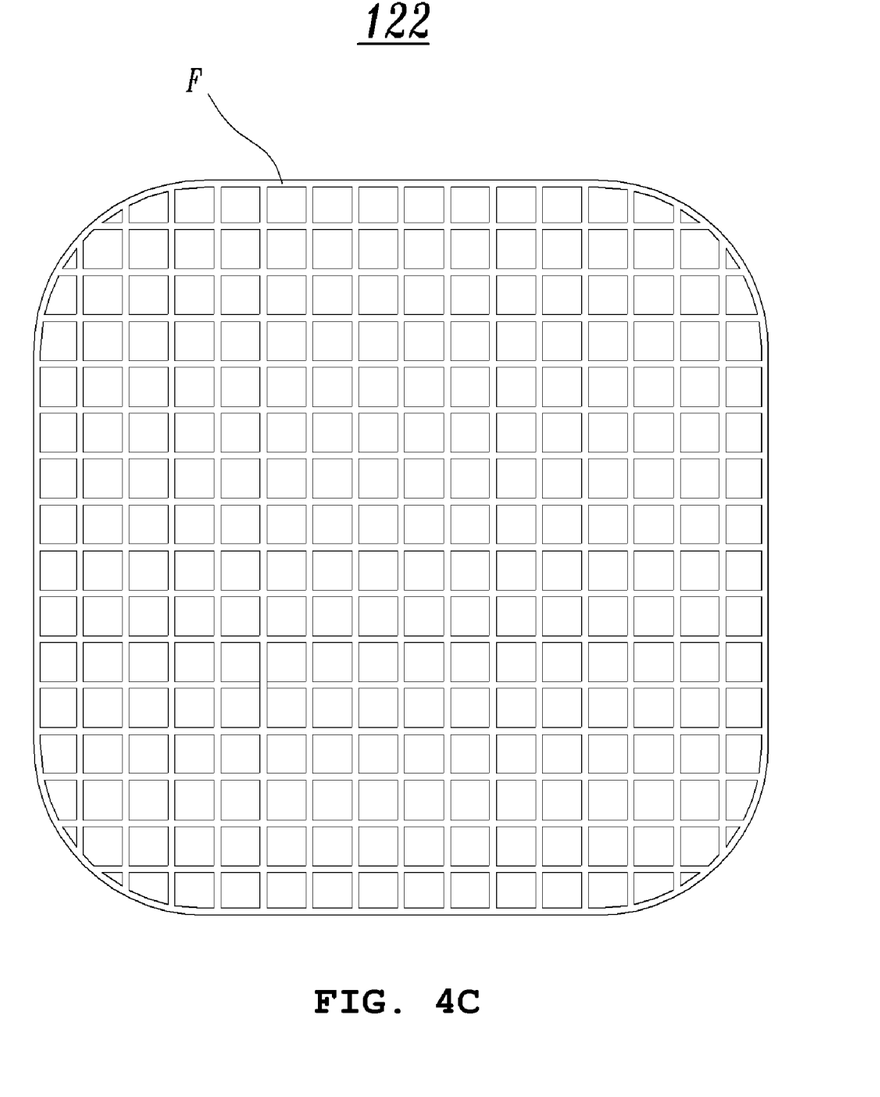

Referring to FIG. 4A, the reticular superelastic alloy structure 122 is fabricated in the form of a lattice such as mesh. Further, as shown in FIG. 4B, the reticular superelastic alloy structure 122 of the present invention may be provided with a frame (F) along the outer circumference thereof. The frame (F) may not have a rectangular or square shape as shown in FIG. 4B, and may have various shapes as shown in FIG. 4C.

Figure 5:
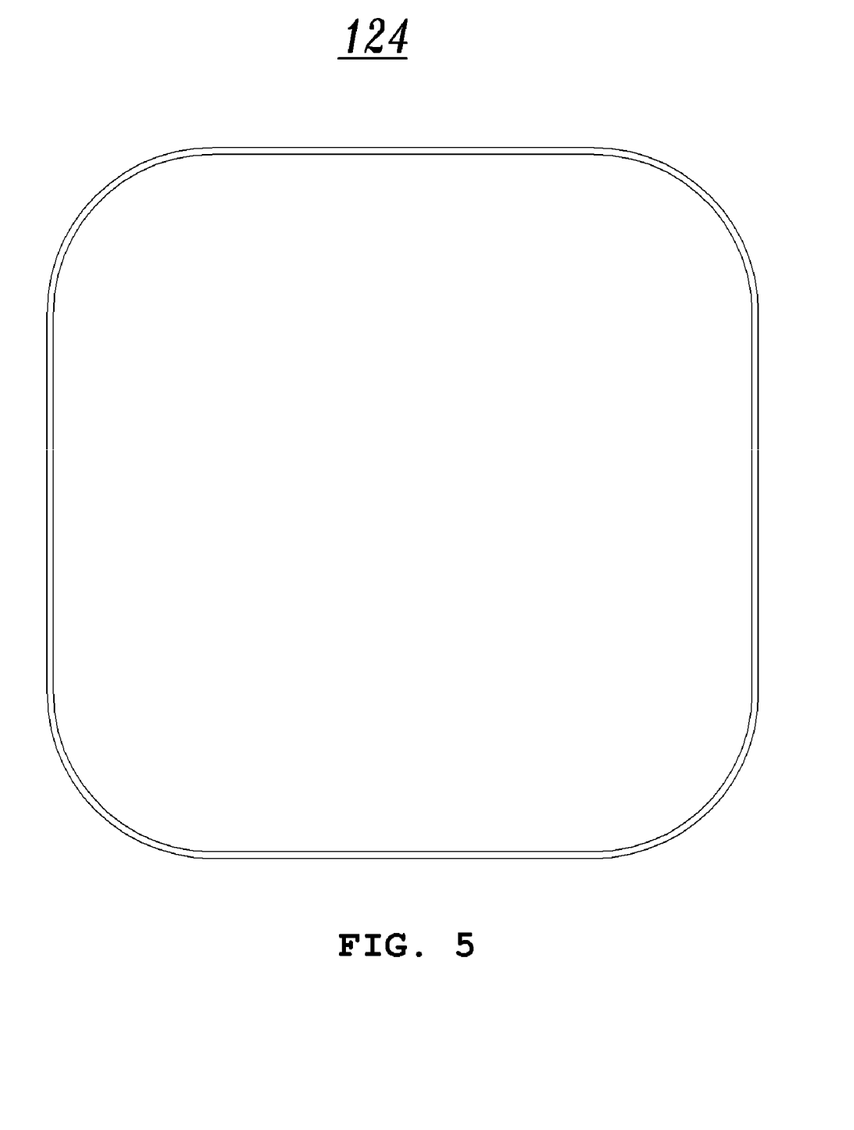
FIG. 5 is a plan view showing an annular superelastic alloy structure according to an embodiment of the present invention.

Meanwhile, as shown in FIG. 5, the annular superelastic alloy structure 124 has a rectangular or square shape in which a closed loop is formed, and its corners are rounded. The shape of the annular superelastic alloy structure 124 is not limited to the aforementioned shapes.

The reticular superelastic alloy structure 122 or annular superelastic alloy structure 124 may be made of any one selected from the group consisting of Ni—Ti, Ni—Al, Cu—Zn—Ni, Cu—Al—Ni, Cu—Al—Mn, Ti—Ni—Cu—Mo, Co—Ni—Ga—Fe, Ag—Ni, Au—Cd, Fe—Pt, Fe—Ni, and In—Cd.

In the present invention, the thickness of the reticular superelastic alloy structure 122 or annular superelastic alloy structure 124 may be set to be 0.01~1,000. It is obvious that the thickness thereof be changed and set depending on the thickness of the polymer substrate.

Figure 6:
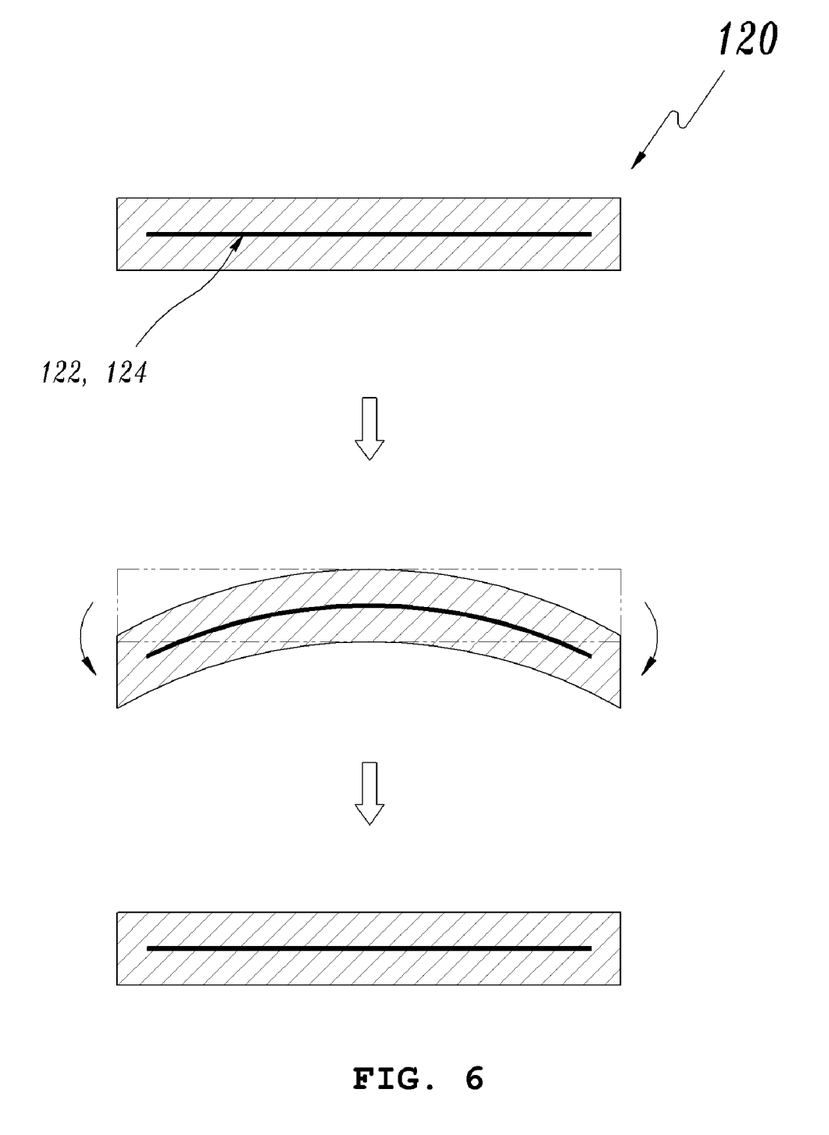
FIG. 6 is a view for explaining the flexibility of the polymer substrate according to an embodiment of the present invention.

When external warping stress is applied to the reticular superelastic alloy structure 122 or annular superelastic alloy structure 124, which is embedded in the polymer substrate 120, it is elastically deformed together with the polymer substrate 120, and when the applied external warping stress is removed therefrom, it returns to its original state (refer to FIG. 6).

Since the polymer substrate 120 of the present invention includes the reticular superelastic alloy structure 122 or annular superelastic alloy structure 124, its elastic limit including structural solidity is increased compared to a polymer substrate which does not include the reticular superelastic alloy structure 122 or annular superelastic alloy structure 124. That is, the elasticity of the superelastic alloy structure is added to that of the polymer substrate itself, and as a result, the flexibility of the polymer substrate is increased or improved.

As described above, according to the present invention, the flexibility of the polymer substrate for flexible displays can be improved.

INDUSTRIAL APPLICABILITY

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

We claim:

1. A flexible display component, consisting of a polymer substrate, wherein the polymer substrate has a superelastic alloy structure disposed therein, wherein the superelastic alloy structure is at least one of a reticular and an annular superelastic alloy structure.

2. The flexible display component of claim 1, wherein the superelastic alloy structure includes a reticular superelastic alloy structure and an annular superelastic alloy structure, further wherein the reticular superelastic alloy structure and annular superelastic alloy structure are embedded and layered in the polymer substrate.

3. The flexible display component according to claim 1, wherein the polymer substrate is made of any one selected from the group consisting of polyethylene naphthalate (PEN), polycarbonate (PC), and polyethylene terephthalate (PET).

4. The flexible display component according to claim 1, wherein the reticular superelastic alloy structure has a frame along an outer circumference thereof.

5. The flexible display component according to claim 1, wherein the reticular superelastic alloy structure is made of any one selected from the group consisting of Ni—Ti, Ni—Al, Cu—Zn—Ni, Cu—Al—Ni, Cu—Al—Mn, Ti—Ni—Cu—Mo, Co—Ni—Ga—Fe, Ag—Ni, Au—Cd, Fe—Pt, Fe—Ni, and In—Cd.

6. The flexible display component according to claim 1, wherein the annular superelastic alloy structure is made of any one selected from the group consisting of Ni—Ti, Ni—Al, Cu—Zn—Ni, Cu—Al—Ni, Cu—Al—Mn, Ti—Ni—Cu—Mo, Co—Ni—Ga—Fe, Ag—Ni, Au—Cd, Fe—Pt, Fe—Ni, and In—Cd.

7. A flexible display, comprising a polymer substrate including a superelastic alloy structure disposed therein, wherein the superelastic alloy structure is at least one of a reticular and an annular superelastic alloy structure.

8. The polymer substrate according to claim 7, wherein at least one of the annular and the reticular superelastic alloy structure is made of any one selected from the group consisting of Ni—Ti, Ni—Al, Cu—Zn—Ni, Cu—Al—Ni, Cu—Al—Mn, Ti—Ni—Cu—Mo, Co—Ni—Ga—Fe, Ag—Ni, Au—Cd, Fe—Pt, Fe—Ni, and In—Cd.

9. The flexible display of claim 7, wherein the polymer substrate is made of any one selected from the group consisting of polyethylene naphthalate (PEN), polycarbonate (PC), and polyethylene terephthalate (PET).

* * * * *